United States Patent [19]

Piesik

[11] 4,324,167
[45] Apr. 13, 1982

[54] FLEXIBLE AREA LAUNCH TUBE REAR COVER

[75] Inventor: Edward T. Piesik, Pomona, Calif.

[73] Assignee: General Dynamics, Pomona Division, Pomona, Calif.

[21] Appl. No.: 139,629

[22] Filed: Apr. 14, 1980

[51] Int. Cl.³ .................................................. F41F 3/04
[52] U.S. Cl. ...................................... 89/1.8; 89/1.812; 89/1.816
[58] Field of Search ................ 89/1.816, 1.817, 1.818, 89/1.8, 1.809, 1.810, 1.812

[56] References Cited

U.S. PATENT DOCUMENTS

| | | | |
|---|---|---|---|
| 2,445,423 | 7/1948 | Eastman | 89/1.8 |
| 2,998,754 | 9/1961 | Bialy | 89/1.816 |
| 3,124,040 | 3/1964 | Fieldler | 89/1.816 |
| 3,128,671 | 4/1964 | Mairs et al. | 89/1.8 |
| 3,182,554 | 5/1965 | Barakauskas | 89/1.818 X |
| 3,228,296 | 1/1966 | Neuman et al. | 89/1.8 |
| 4,044,648 | 8/1977 | Piesik | 89/1.816 X |
| 4,134,327 | 1/1979 | Piesik | 89/1.816 X |
| 4,173,919 | 11/1979 | Piesik | 89/1.816 X |
| 4,186,647 | 2/1980 | Piesik | 89/1.816 X |

Primary Examiner—David H. Brown
Attorney, Agent, or Firm—Henry M. Bissell; Edward B. Johnson

[57] ABSTRACT

A rear cover for rocket launch tubes providing a seal between the tube and the rear of the rocket. The rocket is arranged in a manner such that the exhaust of a firing rocket will produce a seal between a sealing member and the rear of the rocket and will seal off the portion of the tube adjacent to the rocket itself, thus preventing exhaust gases from entering this portion of the launch tube.

17 Claims, 5 Drawing Figures

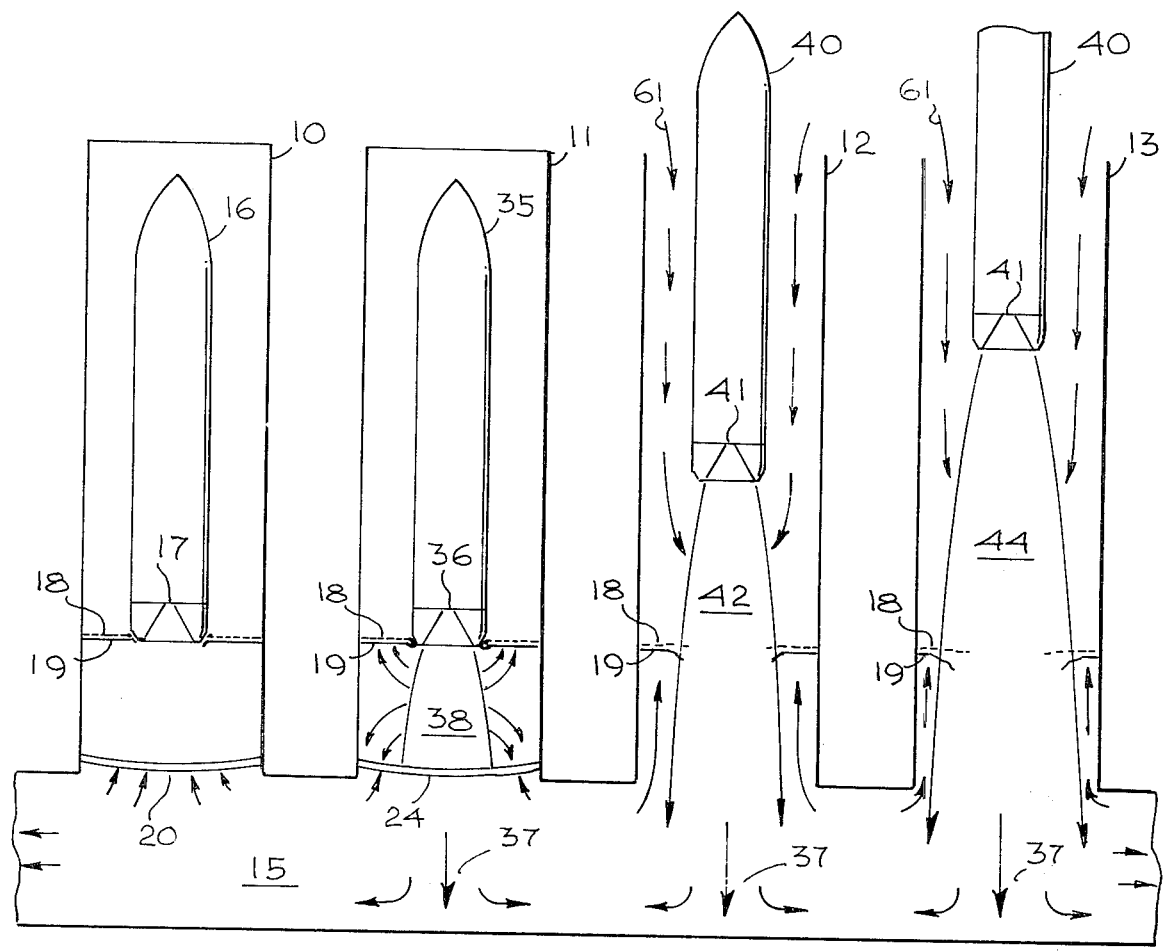
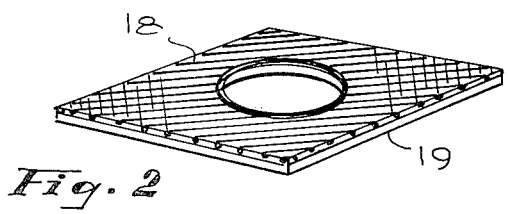
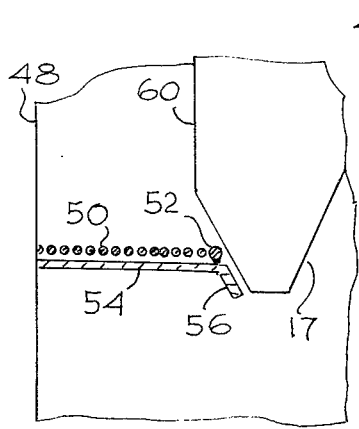 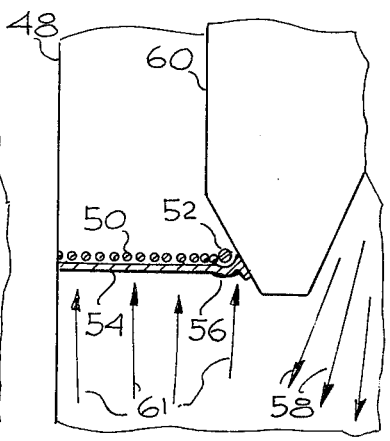 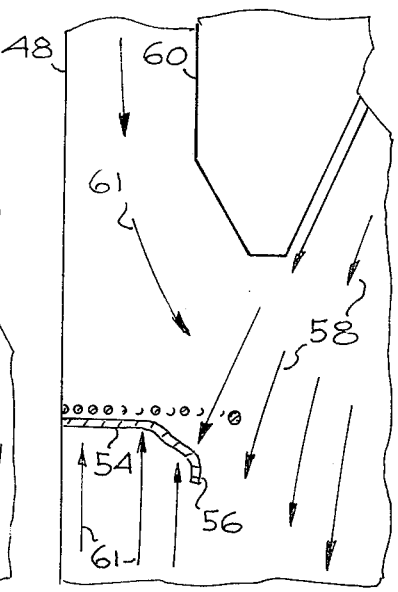

FLEXIBLE AREA LAUNCH TUBE REAR COVER

BACKGROUND OF THE INVENTION

1. Field of the Invention

The present invention relates generally to a system for: (a) the sealing of a rocket launch tube prior to lift-off of the rocket contained in the launch tube, thus preventing the flow of exhaust gases into the tube area around the rocket itself; and (b) preventing the exaust gases from flowing around the rocket during the flyout of the rocket from the launch tube.

2. Description of the Prior Art

For military applications rockets, missiles, or other exhaust-gas propelled vehicles are often stored in closely adjacent magazines, chambers or launch tubes. In these cases, exhaust gas ducts are normally provided to convey rocket exhaust gases generated during rocket ignition to a safe location. Where available space is at a premium, as for example on board ship, manifolding of a number of closely adjacent launch tubes or chambers into a common exhaust manifold or plenum chamber is often necessary.

Various problems may develop if ducts connecting launch tubes to a common exhaust manifold are normally open before launch of the vehicles. If one or more of these rockets is intentionally or accidentally ignited, portions of the resulting exhaust gases, which may have temperatures as high as 6,000° F., can be circulated through the common manifold, into the connecting ducts and into other launch chambers. This could ignite other rockets. Also, the warheads in the launch chambers could be detonated by these hot gases. At a minimum, the gases could damage the rocket, associated equipment and hold-down devices. Thus accidental or intentional ignition of one rocket could render a whole ship or launching system ineffective. In addition, if the some of the launch tubes are open at their upper ends, exhaust gases entering the chambers through the connecting ducts could escape through the open outer ends. This event could cause further heat or other damage.

To prevent such an occurrence, various types of safety doors and valves have been proposed in the past. These are normally installed either at the exhaust gas outlet of each launch chamber of in the connecting duct to the gas manifold. When the rocket is ignited, the associated safety door or valve is caused to open, usually in response to the exhaust gas. The result will be the admission of exhaust gases into the manifold or exhaust duct and into the area surrounding the rocket itself. The doors and valves associated with the system's launch tubes, containing rockets which are not being ignited, are normally maintained closed to prevent circulation of the exhaust gases. However, a malfunctioning door or valve could allow exhaust gases from one tube to enter the other launch tube.

Such doors and valves have been disclosed, for example, in U.S. Pat. No. 2,445,423 of Eastman which discloses a safety container for rockets. The disclosed hold-down doors consist of a one-way, two-flap check valve with associated springs to hold the flaps closed. The blast of exhaust gases from the ignition of the rocket blows the check valve open and actuates the system.

A second rocket exhaust control apparatus has been disclosed in applicant's prior U.S. Pat. No. 4,044,648. This patent discloses flow control doors which are hinged and provided with counterweights so that they are normally closed, but open under gas pressure after rocket ignition. The increased pressure in the exhaust duct will maintain the doors of the other launch chambers in the closed position and protect un-ignited rockets which are being stored.

Another type of rear door for rocket launch tubes is disclosed in applicant's prior U.S. Pat. No. 4,134,327. In this disclosure, the door is latched open and normally remains open until the rocket is launched. A protective seal or cover will normally close the launch tube until the missile is fired. After firing the door is released by, for example, a sensor as the missile leaves the launch tube. Gases from the launched rocket can also be used to power the door closed and a latch is provided to hook the door in place and seal off the launch tube from the associated plenum chamber after firing.

Still another apparatus for sealing launch tubes is disclosed in applicant's prior U.S. Pat. No. 4,186,647. In this case, a cover normally blocking the connection between the launch tube and the duct or plenum is provided. The cover has at least one frangible center section which is broken in response to the pressure and temperature of the exhaust of the exiting rocket. The breaking of the section opens a connection between the launch tube and the plenum. Thus, the system seals the tube from the plenum prior to firing but allows the escape of the rocket exhaust gases after ignition.

Further reference is made to Betts et al U.S. Pat. Nos. 3,968,646, 4,033,121 and 4,036,013. These patents disclose a rocket nozzle closure for controlling release of pressure. The nozzle is arranged in a manner which effects closing incrementally and continuously. As a result thereof, release of pressure is controlled by the rate of change of momentum of the system.

SUMMARY OF THE INVENTION

In accordance with the present invention, an apparatus is disclosed for closing an intermediate point in a launch tube for exhaust-propelled vehicles, such as rockets or missiles. The apparatus, in particular, is designed to seal against the end of the rocket for the time period between ignition and lift-off, in response to the exhaust gas pressure. The seal is then broken and can be removed by impingement of exhaust gases on it as the rocket leaves the launch tube. In addition, the apparatus is designed to provide a secondary or back-up seal for launch tubes which have a primary seal more closely aligned with the juncture of the launch tube and plenum chamber or duct. This back-up system prevents back flow of the exhaust gases of other rockets from reaching the area around the rocket in question. The present invention, in addition to providing optional rear doors such as those described above, provides a launch tube for a rocket that is closed by a flexible/ablative rear cover around the rear of the rocket inside the launch tube. Initially, the rocket exhaust flows through a circular area in a flexible cover and, due to the pressure increase produced by the exhaust gases, the cover is pressed against the rear of the rocket. The resulting contact seals the upper area of the launch tube, that is the area around the rocket itself, from the flow of the exhaust gases. A support screen is positioned above the flexible member and prevents the apparatus from distorting out of place and breaking the seal under ordinary plenum gas pressures. Further, the seal distorts downwardly after lift-off and is optionally ablative as well as flexible during lift-off of the rocket.

The downward flex, and thus the area available for exhaust gas flow, increases during launch as the rocket moves upward, causing the distortion and/or the loss of material as the apparatus of the present invention tends to comply with the impact of the rocket's exhaust gases. The apparatus may be used alone, as it forms a seal between the plenum chamber and the majority of the volume of the launch tube in the system, or it may be used in conjunction with known sealing means which ordinarily seal the tube from the plenum chamber, such as those disclosed in applicant's previously discussed patents.

When an additional form of rear launch tube cover is used in conjunction with the seal of the present invention, the present seal provides a back-up system. In addition, during the time immediately after ignition, pressure is increased in the volume produced by the launch tube, the launch tube cover, and the seal of the present invention. Such pressure will initiate the removal of material from the launch tube cover or open the launch tube cover by other means. Further, without the seal of the present invention, it is possible for exhaust gases in the volume or in the plenum to pass into the tube. The present seal is designed to prevent surge in the rocket direction and eliminate exhaust gas back flow into the tube during the launch period.

On the other hand, once the rocket has been launched and has left the tube, in the apparatus of the present invention, the connection between the exhaust manifold and the launch tube remains open. Should this produce a problem, the type of door disclosed in applicant's prior U.S. Pat. No. 4,134,327, referred to above, could conveniently be used in addition to the apparatus of the present invention.

The novel features that are considered characteristic of the invention are set forth with particularity in the appended claims. The invention itself, however, both as to its organization and method of operation, as well as additional objects and advantages thereof, may be best understood from the following description when read in conjunction with the accompanying drawings.

BRIEF DESCRIPTION OF THE DRAWINGS

FIG. 1 is schematic side elevation view showing a plurality of launch tubes having rockets therein, one showing a stored rocket, one illustrating a held-down rocket during ignition, and the other two illustrating rockets in various stages of ascent;

FIG. 2 is an isometric view of the seal of the present invention; and

FIGS. 3A-3C are sectional schematic views of a portion of the seal in accordance with the present invention showing, in FIG. 3A, the seal position when stored, in FIG. 3B, the seal position immediately after ignition, and, in FIG. 3C, the seal position after lift-off.

DESCRIPTION OF THE PREFERRED EMBODIMENTS

Referring now to the drawings and in particular to FIG. 1, a launch installation is schematically illustrated. The installation includes a plurality of launch tubes 10-13. It is understood that the number of launch tubes is arbitrary, and that more or fewer tubes may be provided, as desired. The launch tubes are capable of being connected to a common duct or plenum chamber 15 for conducting exhaust gases, created by the launch of one of the rockets, away from launch tubes 10-13. It will, of course, be understood that instead of rockets, missiles or other exhaust-powered vehicles may be utilized.

Launch tube 10 illustrates rocket 16 disposed therein and held in place by suitable hold-down devices (not shown). Such devices are well known to those skilled in the art. The rocket is provided with exhaust gas nozzle 17 through which hot exhaust gases emerge after ignition. The tube is also provided with supportive screen 18 which projects from the tube to the edge of rocket nozzle 17 and toward the rocket skin. In addition, flexible and ablative rear cover 19 is provided immediately adjacent to supportive screen 18 and also covers the area from the rocket tube to the nozzle. It is also to be understood that flexible cover 19 and supportive screen 18 need not necessarily abut the rocket nozzle or other portion of the rocket at all times. However, they must be in a position where, upon the application of pressure to cover 19 from below, the cover supported by the screen will seal against the portion of rocket 16 that it is next adjacent. The bottom of launch tube 10 is shown closed with one of optional cover members 20.

In tube 11, rocket 35 has just ignited and exhaust plume 38 is producing pressure on cover 19, closing the seal against nozzle 36 in accordance with the present invention. Cover 19 is supported by screen 18 and held in position to seal the remainder of the chamber. By reaching a predetermined pressure, or upon overcoming the pressure in plenum, 15 optional cover member 24 completely opens and the exhaust gases pass out into the plenum, as indicated by arrows 37.

After lift-off, rocket 40 in chamber 12 breaks the seal produced by cover 19 and screen 18 after nozzle 41 traverses the seal area. At this point, the seal of the present invention (cover 19) is deformed relatively downward under the influence of the impinging rocket exhaust and initial removal of material from it may occur. In this portion of the illustration, the exhaust gases are continuing to flow in the pattern shown by arrows 37 and produce the above deformation and material removal. Exhaust gases 37 from the plenum are pushing upward on cover 19 supported by screen 18 and are thus prevented from recirculating in launch tube 12 around rocket 40 due to the formation of a seal.

In launch tube 13, rocket 40 has continued its upward motion and exhaust plume 44 has continued to deform and ablate cover 19 and possibly abrade screen 18. It is to be understood that screen 18 may also be ablative and may be partially removed by the exhaust gases in the same manner as cover 19 which is more completely ablated. When the top of launch tube 12 or 13 is open, by means not shown, air 61 outside of the launch tube is aspirated into the top of the launch tube and conveyed to the viscous mixing region of the rocket exhaust. If the top of the launch tube is not open, for example, during a restrained firing, pressure in launch tube 11 will decrease below its original value as the air in the launch tube flows into the viscous mixing region of the exhaust. Either of these above conditions is desirable and both are possible because of the function of cover 19 which prevents exhaust gases 37 from recirculating back up into the launch tubes. It is understood that this is the case whether additional cover member 24 is incorporated or not.

In FIG. 2, screen 18 and flexible ablative rear cover 19 are shown as a single entity. It is understood that the apparatus is compatible with any launch tube cross-sectional geometry. The screen and cover are provided with an annular orifice in the center which forms the seat for the seal around the nozzle or the rear portion of the rocket.

In FIG. 3A, a slightly schematic section shows tube wall 48 having attached thereto support screen 50. Support screen 50, in this detailed perferred embodiment, is provided with toroidal reinforcing lip 52 around its aperture, the center of which is normally adjacent the end of rocket 60. Flexible seal 54 is provided with annular sealing means 56, shown in the form of a cylindrical or conical lip in the area of the flexible seal next adjacent rocket 60. This seal portion is constructed in such a manner that when pressure is applied to the undersurface of flexible seal 54 it is deformed upward and sealing means 56 comes in contact with the base of the rocket. This contact produces the seal and prevents fluid flow upward into the area around the rocket itself. It is to be understood that the shape of the seal may vary depending on, for example, the shape of the portion of the rocket with which the seal is to come in contact and the desired pressure build-up in the chamber produced by the tube, the seal, and rocket and the cover of this invention.

FIG. 3B shows the position of the seal member immediately after ignition of rocket 60. Pressure 61 has caused flexible seal member 54 to be distorted upward and seal means 56 to come into contact with rocket 60, screen 50 and toroidal reinforcing lip 52, effectively preventing flow of exhaust gases in the upward direction. It is understood that this is the condition during the entire rocket burn if, for any reason, the rocket does not lift-off.

FIG. 3C shows the deformation of the system of the present invention immediately after lift-off, rocket 60 being displaced upward, relative to the prior figures. Seal 54 and sealing means 56 are significantly deformed in reaction to the impingement of exhaust gases 58 from above. This is the status of the sealing members of the present invention immediately after lift-off, and it is to be understood that once rocket 60 has proceeded upward, exhaust plume 58 will be sufficiently wide to remove and/or distort part of seal 54 and sealing means 56, thereby increasing the flow area through seal 54. If desired, part of screen 50 and support torus 52 may be distortable or ablative. It is further understood that seal 54 and sealing means 56 continue to prevent recirculating plenum gases 61 from entering launch tube 48 in the area adjacent rocket 50 as it proceeds upward. In addition, since the gases are prevented from flowing into the adjacent area, the pressure produced by the recirculating plenum gases does not reach rocket 50. It is further understood that air 61 from the top of launch tube 48 will continue to flow through the launch tube and into the viscous mixing region of exhaust 58 as the rocket proceeds upward.

Although there have been described above specific arrangements, of flexible area launch tube rear cover means between the tube of a rocket launcher and the rocket itself, particularly usable in most systems employing multiple launch tubes and associated exhaust gas removal plenums, in accordance with the invention for the purpose of illustrating the manner in which the invention may be used to advantage, it will be appreciated that the invention is not limited thereto. Accordingly, any and all modifications and variations which may occur to those skilled in the art should be considered to be within the scope of the invention as defined in the appended claims.

What is claimed is:

1. An apparatus for sealing a portion of a launch tube for exhaust-propelled vehicles and for allowing free flow of exhaust gases after lift-off comprising:
    a launch tube;
    duct means adjacent to said launch tube for conducting the exhaust of said vehicle away from said vehicle; and
    flexible sealable means extending across at least the open portion of the launch tube in the vicinity of the duct means.

2. The apparatus of claim 1 wherein said sealable means comprises a support member and a flexible seal member.

3. The apparatus of claim 2 wherein said members are located adjacent the exhaust of said vehicle and contain an opening of substantially the same size as an external surface of said vehicle.

4. The apparatus of claim 3 wherein said support member includes a toroidal lip at said opening.

5. The apparatus of claim 3 wherein said support member is a screen and abuts the seal member at said opening.

6. The apparatus of claim 5 wherein said seal member includes a conically shaped lip.

7. The apparatus of claim 2 wherein said sealable means is flexible and is distorted by the exhaust plume of said vehicle during launching.

8. The apparatus of claim 7 wherein said sealable means is ablative and is removable by the exhaust plume.

9. An apparatus for sealing a portion of a launch tube for exhaust-propelled vehicles and for allowing free flow of exhaust gases after lift-off comprising:
    a launch tube;
    a duct disposed adjacent said launch tube for conducting the exhaust of said vehicle away from said vehicle;
    sealing means disposed from said tube to adjacent said vehicle; and
    a normally closed cover positioned substantially at the intersection of said tube and said duct.

10. The apparatus of claim 9 wherein said sealing means and said cover initially form a closed chamber at the ignition of the vehicle and said sealing means prevents flow of exhaust gases upward through said tube after ignition and lift-off.

11. The apparatus of claim 9 wherein said sealing means comprises a support member and a flexible seal member.

12. The apparatus of claim 11 wherein said members are located next adjacent the exhaust of said vehicle and contain an opening of substantially the same size as the external surface of said exhaust.

13. The apparatus of claim 12 wherein said support member includes a toroidal lip at said opening.

14. The apparatus of claim 12 wherein said seal member includes a seal at said opening.

15. The apparatus of claim 14 wherein said seal is conical in shape.

16. The apparatus of claim 12 wherein said sealing means is flexible and is distorted by the exhaust plume of said vehicle during launching.

17. The apparatus of claim 16 wherein said sealing means is ablative and is removable by the exhaust plume of said vehicle.

* * * * *